United States Patent [19]

Schreiter et al.

[11] Patent Number: 5,598,149

[45] Date of Patent: Jan. 28, 1997

[54] COMMERCIAL-SIZE, AUTOMATIC INDUSTRIAL PLANT HAVING SEVERAL PARTS

[75] Inventors: Klaus-Dieter Schreiter, Erlangen; Wilhelm Stewen, Oberhausen, both of Germany

[73] Assignees: Siemens Aktiengesellschaft, Munich; Ruhrkohle Aktiengesellschaft, Essen, both of Germany

[21] Appl. No.: 185,803

[22] PCT Filed: Jul. 30, 1992

[86] PCT No.: PCT/EP92/01725

§ 371 Date: Mar. 28, 1994

§ 102(e) Date: Mar. 28, 1994

[87] PCT Pub. No.: WO93/03429

PCT Pub. Date: Feb. 18, 1993

[30] Foreign Application Priority Data

Jul. 31, 1991 [DE] Germany ............................ 41 25 374.4

[51] Int. Cl.$^6$ ................................................. H04Q 9/00
[52] U.S. Cl. .............................. 340/825.06; 340/825.22; 340/825.52; 364/131; 364/138
[58] Field of Search ................... 340/825.22, 825.06, 340/825.52, 825.5; 364/131, 132, 134, 138, 496–503, 426; 370/58.1

[56] References Cited

U.S. PATENT DOCUMENTS

| 4,196,471 | 4/1980 | McClure ................................ 364/426 |
| 4,347,564 | 8/1982 | Sugano et al. ........................ 364/132 |
| 4,500,951 | 2/1985 | Sugimoto et al. .................. 364/138 X |
| 4,607,256 | 8/1986 | Henzel ............................... 340/825.52 |
| 4,827,423 | 5/1989 | Beasley et al. ....................... 364/468 |
| 4,831,582 | 5/1989 | Miller et al. ......................... 364/900 |
| 4,870,590 | 9/1989 | Kawata et al. ....................... 364/468 |
| 4,885,742 | 12/1989 | Yano ............................... 340/825.5 X |
| 4,888,726 | 12/1989 | Struger et al. ....................... 364/900 |
| 4,935,863 | 6/1990 | Calvas et al. ......................... 364/138 |
| 4,965,880 | 10/1990 | Petitjean .............................. 364/468 |
| 5,134,574 | 7/1992 | Beaverstock et al. ............. 364/551.01 |
| 5,142,682 | 8/1992 | Lemay et al. .................... 340/825.5 X |
| 5,146,401 | 9/1992 | Bansal et al. ......................... 364/138 |
| 5,255,197 | 10/1993 | Iida ..................................... 364/468 |
| 5,291,190 | 3/1994 | Scarola et al. ..................... 364/138 X |

FOREIGN PATENT DOCUMENTS

| 0281785A2 | 9/1988 | European Pat. Off. . |
| 298396 | 1/1989 | European Pat. Off. ............... 364/131 |
| 1185702 | 7/1989 | Japan .................................... 364/131 |
| 229801 | 1/1990 | Japan .................................... 364/131 |
| 2211000 | 6/1989 | United Kingdom . |

OTHER PUBLICATIONS

Thurston, C. W. "Experience with a Large Distributed Control System," *Control Engineering*, (Jun. 1979), pp. 61–65.

Mühlenkamp, "Leittechnik mit speicher–programmierbaren Steuerungen," *Elektronik*, vol. 22, pp. 103–110, (Nov. 4, 1983).

(List continued on next page.)

*Primary Examiner*—Michael Horabik
*Assistant Examiner*—William H. Wilson, Jr.
*Attorney, Agent, or Firm*—Kenyon & Kenyon

[57] ABSTRACT

A common automation system for various partially interacting plant parts of a commercial-size, automatic industrial plant, and in particular, of a primary industrial plant such as a coke oven. The common automation system includes automation devices which carry out individual functions and which are connected by means of data lines to a master control unit and via the latter to one another. The automation devices are connected to one another via local data transmission units to exchange data directly, thereby defining automation groups individually capable of operating autonomously, according to the technological structure of the plant. The automation devices independently process the values from the plant and adjust, control, and regulate the plant components assigned to an automation group, distributed according to their programming based on the plant data supplied to them.

23 Claims, 1 Drawing Sheet

OTHER PUBLICATIONS

Schreiter, "Trend-Setting Automation in New Kaiserstuhl III Coking Plant," *Siemens Engineering & Automation*, vol. 13, No. 5, pp. 26–29 (Sep./Oct. 1991).

Aoki, "Programmable Controller in a Hierarchical Network," Journal of Electronics Engineers, vol. 24, No. 245, pp. 50–51 (May 1987).

Stoffel, "PLC Builds in Ethernet Port For VAX Connectivity," *Control Engineering*, vol. 36, No. 9, pp. 80–81 (Sep. 1989).

Schmidt-Balve et al., "Prozeßleitsystem für eine Kokereianlage," *Haus der Technik*, No. 485, pp. 4–9. No Date.

Schreiter, "Kokerei Prosper: Homogene Automatisierungsstruktur löst Nahtstellenprobleme," *Siemens Energie & Automation*, vol. 8, No. 4, pp. 219–223 (May/Jun. 1986).

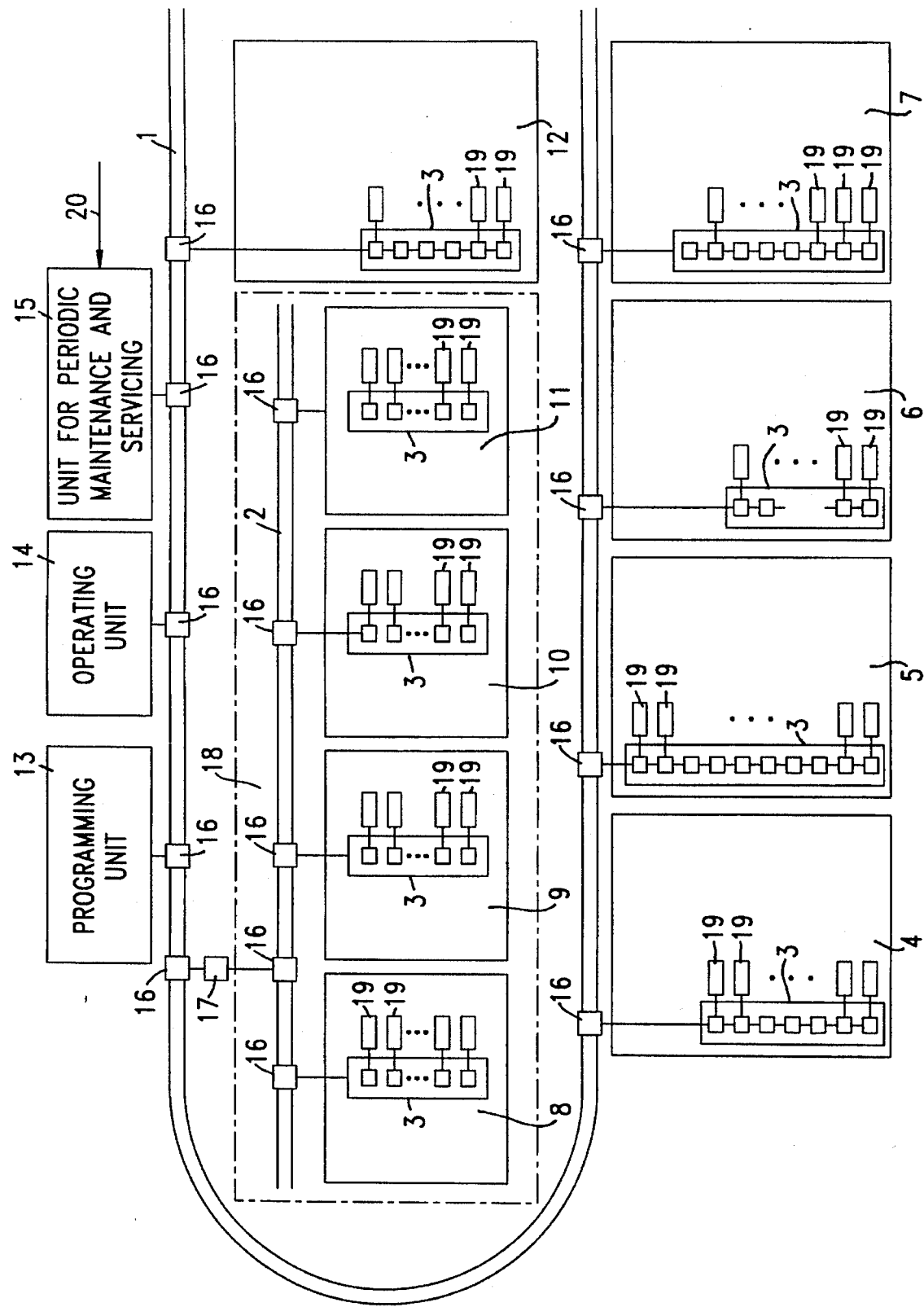

COMMERCIAL-SIZE, AUTOMATIC INDUSTRIAL PLANT HAVING SEVERAL PARTS

BACKGROUND OF THE INVENTION

The present invention relates to an automation system for various plant parts, which partially interact with one another, of a commercial-size, automatic industrial plant, and in particular of a primary industry plant, for example coke ovens. The common automation system has automation devices which carry out individual functions and which are connected, by means of data lines, to a master control unit and, via the latter, to one another.

Commercial-size, automatic industrial plants having several parts have a multiplicity of individual functions to be controlled and regulated in an interacting manner. The individual functions are usually monitored, controlled and regulated by automation systems, for example, the Simatic S5 system of Siemens AG. In the past the individual automation devices either exchanged data directly with one another or communicated via a bus system, with one another and with a master control unit, if the plant had such a unit. The individual automation devices were connected to the bus system via parallel or, more often, serial interfaces.

A corresponding system and the automation devices used in it are shown, for example, by the Simatic S5 brochure "Individuelle Lösungen für jede Automatisierungsaufgabe" (Individual solutions for every automation task) of Siemens AG, Order no. A 19100-E81-B552. On the page "Offene Kommunikation in jeder Automatisierungsebene" (Open communication on every automation level), open, local bus systems are shown by way of example. Such automation systems can be used universally and are good at meeting the requirements for a partially or fully automatic mode of operating plants. However, the data management in such automation systems requires a relatively considerable effort. Further, in the event of plant extensions or modifications, parts of the software systems must be newly created. Furthermore, in the event of plant modifications or extensions, interface problems also often arise. In addition, large volumes of data have to be moved via the bus systems and/or the master control unit. Reprogramming operations require considerable effort and are therefore often deferred, even when such reprogramming operations are necessary.

A "Prozessleitsystem für eine Kokereianlage" (Process control system for a coking plant), equipped with freely programmable, autonomous control devices, is known from "Haus der Technik, Vortragsveröffentlichungen 485" (House of technology, lecture publications 485), Authors: H. Schmidt-Balve and U. Prüser, pages 4 to 9. In the Schmidt-Balve article, and in particular FIG. 3, sensors, stored-program controllers (SPCs) and an operating control computer form a process level, a data processing level and a master control level. Unfortunately, in the process control system discussed in the Schmidt-Balve article, considerable data management effort and interface problems arise. Since the volume of data to be processed by the master control computer is great, its failure or a loss of data have serious consequences.

A configuration of a process control system of a similar type with three levels, but using largely the same automation devices, is shown by the automation structure of Kokerei Prosper, which is published under the title "Homogene Automatisierungsstruktur löst Nahtstellenprobleme" (Homogeneous automation structure solves interface problems) in the journal Siemens Energy & Automation, 8th year, Issue 4, May/June 1986 on pages 219 to 223. Here, the automation devices of the master control level are connected in a star manner to the automation devices of the processing level. This also applies to the fault messages. Although the hierarchical structure shown is already subdivided and the device types are largely standardized, the plant is nevertheless still configured on the principle of conventional technology of known automation systems.

It is the object of the present invention to specify a commercial-size, automatic industrial plant having several parts, and in particular a primary industry plant, which is configured in an advantageous, novel way with respect to its automation structure. It is a further object of the present invention to considerably relieve the existing data buses and interfaces compared with the known process control systems. Furthermore, it is an object of the present invention to permit autonomous continued operation of the individual plant parts even in the event of faults in the master control unit and its peripherals, in the bus system or in any automation group without having to rely on elaborate redundancy.

SUMMARY OF THE INVENTION

The present invention achieves the above objects by connecting the automation devices to one another via local data transmission units, to permit direct data exchange, and to form automation groups individually capable of operating autonomously, according to the technological structure of the plant. Hence, the automation devices can independently process the values from the plant and adjust, control and regulate the plant components assigned to an automation group, distributed according to their programming, based on the plant data supplied to them. By departing from the known level structure and creating function areas exchanging data directly by simple and clear structures which can be adapted to the subtasks in a plant, the automation structure of the present invention becomes particularly simple in an advantageous way since many functions previously performed by master control units are transferred to the processing level.

With the arrangement of the present invention, simple and simultaneous commissioning of the various plant parts is possible, while a distinct interfacial delimitation from neighboring and superordinate systems and the possibility of using small and manageable programs optimized area-selectively exists. Thus, extensions, additions and modifications of parts of the plant are possible without adversely affecting the operation in progress of the plant as a whole.

In one embodiment of the present invention, the automation devices are designed as devices of the same type throughout. In this way, software and interfaces are simplified and standardized. If the automation devices are designed as devices of the same type, this type must be selected according to the requirements for the individual device which is loaded (i.e., utilized) the most. While the remaining devices are overequipped (i.e., under-utilized) in terms of hardware, on close examination it has surprisingly been discovered that the rationalization effect attained by the automation devices actually being homogeneous throughout reduces the overall costs of the plant. The advantages of providing a plant with automation devices of the same type offers are, in particular, lower planning and commissioning costs, lower costs in personnel training, less capital tied up in spare part inventories, avoiding interface problems and simpler servicing. In addition, the underutilized hardware still includes considerable capacity in reserve, so that even if there are functional extensions in individual plant parts, no hardware extensions are necessary.

In the present invention, local data transmission units are advantageously unselectively acting interface expanders which, operating as local buses, connect the automation devices to data buses, for example to a main bus or a secondary bus. This advantageously connects the individual automation devices in the automation device groups, with the possibility of direct, fast communication between the individual devices of an automation group with the customary coupling to the bus system. The respective assignment of the data to the automation devices and buses is advantageously performed simply by freely transmitting data without regard to its origin and address recognition.

The coupling elements between the automation groups and the buses, or between the buses themselves, are advantageously designed to act at least partially data-selectively, for example as intelligent bridges, in particular with driver function, to decouple, wherever appropriate, plant parts with large volumes of data. In this case, data selection is performed at local data transmission units, secondary buses and main buses according to the structure of the plant. The coupling or connecting elements hold back the signals relevant only to one plant part from other plant parts. This produces an advantageous reduction in data transmission, in particular in the main bus. Data selectivity is advantageously also achieved by means of an address selection.

The intelligent bridges, for example the data-selectively operating connecting elements, are advantageously designed as 10 Mbit/s base band network amplifiers. Thus, a ready-made electronic component originally developed for bus extension (the SINEC Bridge 402 of Siemens AG), which just like the known buses has already been tried and tested in plants, may be advantageously used. In its new function, such a bridge allows a particularly advantageous design of the automation structure according to the present invention.

The intelligent bridges, which may be arranged in plurality in the buses, or the data-selectively operating connecting elements, are advantageously designed as self-programming to automatically analyze the sender addresses and to transmit only the data which are not addressed to terminals of the same subnetwork (comparison of transmitting and receiving directions). Thus, on the one hand, the volume of data in the buses and in the operating computer is reduced and, on the other hand, it is ensured that all relevant data can pass via the intelligent bridge. This applies both to the data of the operating unit and to the data to and from a programming device or the like, and also, for example, to the data to and from a unit for periodic maintenance and servicing.

In the case of coke ovens, for which the automation structure according to the present invention for primary industry plants was first developed, since the advantages, in terms of cost, are particularly evident, a plurality of visualization and operator control devices for the individual automation groups can be combined in a common master control room.

BRIEF DESCRIPTION OF THE DRAWING

The sole FIGURE shows the automation structure of coke ovens as an example of a commercial-size plant.

DETAILED DESCRIPTION

In the sole Figure, a main bus 1 and a secondary bus 2, form part of an automation structure for a plant, for example to automate gas-treatment and coal by-products plants of coke ovens. The automation devices of the plant are combined in groups 4–12. In the automation device group 7 for example, automation devices 19 are diagrammatically represented as an example. The automation devices 19 are connected by interface expanders or other local data transmission units 3 via interfaces 16 to the main bus 1 or the secondary bus 2. Individual plant parts, 8, 9, 10, and 11 are combined by means of the secondary bus 2 to form an automation group 18. This structure is well suited for plant parts with particularly great interactions amongst themselves.

An intelligent bridge 17 is arranged between the main bus 1 and the secondary bus 2. According to the present invention, the intelligent bridge, operating data-selectively, does not serve for bus extension but rather connects two parallel buses to each other. The interfaces 16 may also be designed as intelligent bridges if required for example, due to large volumes of data.

The plant also has at least one programming device 13, an operating unit 14 and a unit for periodic maintenance and servicing 15. The unit 15 is also provided with data, symbolized by the arrow 20, from outside the automation system.

Fault signals are generally fed to the operating unit 14 or to a special device. Due to the independent operation of the automation devices, fault signals can accumulate in a time-delayed manner. For satisfactory event monitoring, each fault signal is time stamped and can later be sorted in an advantageous way. Thus, as compared with the known star structure, the causes of malfunctions can be determined.

As already diagrammatically indicated, the number of automation devices of each automation device group 4–7 and 12 and also 18 varies and is adapted to the respective task of the automation device group. Thus, for example, the automation device group 4, intended to treat the charge coal, has seven automation devices, the automation group 5 for the stationary units of the coke production means has ten automation devices, the automation device group 6 for the mobile units of the coke production means and the central dust removal means has sixteen automation devices for two sets of oven-attending machines and, finally, the automation group 7 for the coke screening means has eight automation devices.

The automation devices may be, for example, the largest automation devices of the Simatic series of the Siemens company (i.e., the devices S5-155 U). Unexpectedly, in spite of the large number of these devices found in the uppermost capacity range of stored-program controllers (in the case of the planned coke ovens, for example, over 70 devices), with overall increased flexibility, the configuration of the plant is less expensive than if automation devices adapted individually to the respective function requirements, for example of types 135 U or 115 U or still smaller, were used.

The commercial-size, industrial plant automated according to the present invention may be configured differently from the form shown for areas with signals relevant to safety. For example, in the case of shaft hoisting plants or commercial-size hoisting plants, or in chemical plants, a separate, divided structure with automation device groups for signals not relevant to safety and, a smaller, faster operating design used only for signals relevant to safety may be appropriate. Such a plant, however, makes use of the basic idea of the present invention in the same way as the plant with a different bus structure or a greater number of intelligent bridges.

We claim:

1. An automation system for a primary industry industrial plant having several partially interacting parts, comprising:
   a) automation devices which carry out individual functions;
   b) a data bus;
   c) local data transmission units connecting said automation devices thereby permitting said automation devices to exchange data directly and thereby defining automation groups being capable of operating autonomously, according to the technological structure of the plant; and
   d) interface units coupling said local data transmission units to said data bus, wherein said automation devices independently process values from the plant to control the plant components assigned to each of the automation groups distributed according to their programming, based on plant data supplied to them, said interface units allowing communication between automation devices allocated to different automation groups.

2. The automation system of claim 1 wherein said local data transmission units are unselective, thereby operating as local buses.

3. The automation system of claim 2 wherein said local data transmission units are interface expanders.

4. The automation system of claim 1 wherein data is freely transmitted, without regard to its origin, and is assigned to said automation devices and buses based on address recognition.

5. The automation system of claim 1 wherein said interface units are at least partially data-selective in order to decouple plant parts.

6. The automation system of claim 5 wherein said interface units are capable of decoupling plant parts.

7. The automation system of claim 5 wherein said data-selective interface units are self-learning, automatically analyze sender addresses, and transmit only data which are not addressed to automation devices or other devices on the sender side.

8. The automation system of claim 1, wherein said data bus includes a main data bus, a secondary data bus and a data-selective connecting element coupling said main data bus and said secondary data bus.

9. The automation system of claim 8 wherein said data-selective connecting element is an intelligent bridge.

10. The automation system of claim 9 wherein said intelligent bridge includes a driver function.

11. The automation system of claim 8 wherein at least one of said data-selective coupling element and said interface is a 10 Mbit/second baseband network amplifier.

12. The automation system of claim 8 further comprising:
   coke ovens with a gas-treatment plant part and a coal by-products plant part, each plant part coupled with said secondary data bus for their automation devices.

13. The automation system of claim 12 further comprising:
   coke ovens having a coke screening means, a mobile coke production means, a stationary coke production means and a charge coal area combined as a first automation group, and having a coke dry-cooling plant combined as a second automation group, said first and second automation groups each having interface expanders which act as local buses for said automation devices within each automation group.

14. The automation system of claim 1 wherein said interface units perform data transmission by means of addressed signals, holding back signals relevant only to one plant part from other plant parts based on address selection.

15. The automation system of claim 1 wherein said automation devices are of the same type throughout the system.

16. The automation system of claim 1 further comprising:
   e) a programming device, coupled via a first bus interface to said data bus; and
   f) a device for periodic maintenance and servicing, coupled via a second bus interface to said data bus.

17. The automation system of claim 16 further comprising a master control unit, coupled via a third bus interface to said data bus.

18. The automation system according to claim 17 wherein at least one of said first bus interface, said second bus interface, and said third bus interface is a non-data-selective interface.

19. The automation system of claim 1 further comprising autonomous groups for automation of individual functions of the parts of the plant, each of said autonomous groups operating individually, and comprising automation devices of the same design throughout, which operate with the same software, and in which arrangement data are exchanged directly within and between said automation groups by means of address recognition.

20. The automation system of claim 19 wherein said automation devices are stored-program controllers.

21. An automation system for a primary industry industrial plant having severally partially interacting plant parts, comprising:
   a) a data bus;
   b) a plurality of automation device groups assigned to plant parts, at least one of said plurality of automation device groups capable of operating autonomously and including
      i) a plurality of automation devices which carry out individual functions, independently processing values from the plant to control components of the assigned plant parts, and
      ii) a local data transmission unit permitting data communication among said plurality of automation devices; and
   c) a plurality of interface units, each coupling one of said plurality of automation device groups with said data bus and allowing communication between automation devices allocated to different automation device groups.

22. The automation system of claim 21 wherein said local data transmission units are interface expanders.

23. The automation system of claim 21 wherein said interface units are at least partly data selective.

* * * * *